United States Patent Office 3,179,564
Patented Apr. 20, 1965

3,179,564
ANTIRIGOR THIOXANTHENES
Jean Schmutz, Muri, near Bern, Switzerland, assignor to Dr. A. Wander, S.A., Bern, Switzerland, a Swiss corporation
No Drawing. Original application Feb. 23, 1961, Ser. No. 90,943. Divided and this application Apr. 16, 1962, Ser. No. 187,952
5 Claims. (Cl. 167—65)

This application is a continuation-in-part application of my U.S. application Serial No. 860,078, filed December 17, 1959, and a divisional application of my U.S. application Serial No. 90,943, filed February 23, 1961, both now abandoned.

This invention relates generally to new therapeutic compositions and to a novel method of treating a living animal to reduce rigor. More particularly, the present invention relates to a novel therapeutic composition in dosage unit form comprising 9-(N-alkyl-piperidyl-alkyl)-thioxanthene compounds and to the use of this composition to reduce rigor by introducing it into the body of a living animal.

In my U.S. Patent No. 2,905,590 the novel compound 9-(N-methyl-piperidyl-3'-methyl)-thioxanthene and the acid salts thereof having anti-Parkinson activity are disclosed. It has now been unexpectedly discovered that certain other thioxanthene derivatives and the acid addition salts thereof have important antirigor activity of therapeutic value which is entirely lacking in the patented compounds.

The novel thioxanthene compounds of the present invention which have antirigor activity are the bases of the class consisting of 9-(N-ethyl-piperidyl-3'-methyl)-thioxanthene, 9 - (N - n-propylpiperidyl-3'-methyl)-thioxanthene, and 9 - (N - methyl-piperidyl-2'-β-ethyl)thioxanthene; and the acid addition salts of these bases.

The bases described above are organic bases which can be reacted with acids to form readily water-soluble salts useful for oral or parenteral therapy. Although the free bases are the source of the pharmacological utility of the compounds, it is generally more convenient to employ the salts, particularly the hydrochlorides and the tartrates. The salts are formed by well-known techniques, e.g., by neutralizing an ether or alcohol solution of the bases with an acetone or alcohol solution of the desired acid and recrystallising the resultant salts from a water-acetone or an alcohol-ether solution. In forming salts of inorganic acids, it is preferred to employ hydrochloric acid, sulfuric acid, or phosphoric acid. Among the organic acids which can be used for forming salts with good results are acetic acid, maleic acid, tartaric acid and citric acid.

It has been found that the new compounds described above have a specific effect on the central nervous system which can be designated more specifically as antirigor activity. This activity is completely absent in the 9-(N-methyl-piperidyl-3'-methyl)-thioxanthene described in U.S. patent specification No. 2,905,590.

The antirigor effect was tested on decerebrate rats according to the method of C. S. Sherrington [Ciba Foundation Symposium on the neurological basis of behaviour, page 55 ff. (1958)], using rats as test animals. The rigor occuring in the muscles of decerebrate rats is not decreased upon intravenous administration of therapeutical doses of 9-(N-methyl-piperidyl-3'-methyl)-thioxanthene, whereas the higher homologues thereof described above are effective in very small amounts, as shown in the following table:

ANTI-RIGOR EFFECT IN THE MYOGRAM OF DECEREBRATE RATS ACCORDING TO C. S. SHERRINGTON

| Compound tested | Minimum amount necessary for 30% decrease of rigor, mg./kg., i.v. | L.D./50, mg./kg., i.v. |
|---|---|---|
| 9-(N-methyl-piperidyl-3'-methyl)-thioxanthene. | No effect when adm. up to toxic doses. | 18 |
| 9-(N-ethyl-piperidyl-3'-methyl)-thioxanthene. | 0.9 | 24 |
| 9-(N-n-propyl-piperidyl-3'-methyl)-thioxanthene. | 1.2 | 16 |
| 9-(N-methyl-piperidyl-2'-β-ethyl-thioxanthene. | 1.8 | 29 |

The new compounds described before can be employed in the usual forms for therapeutic administration. For example, the active substances may be combined with a suitable pharmaceutical carrier to provide solutions, syrups, tablets, capsules, dragees, suppositories, powders, or the like. The dosage unit form may contain from about five to one hundred mg. of the active substance. In the case of solutions for intravenous injection, the ampoule may contain, by way of illustration, 0.5 to 3% solution, since very small amounts are effective when a solution thereof is injected intravenously. For infusion, the ampoule may contain a 2 to 3% solution with fifty to one hundred mg. of active substance per ampoule. In the case of tablets or the like the dosage of active substance may be five to fifty mg. and for suppositories twenty to one hundred milligrams.

For administering the compounds of this invention, the oral route is normally preferred, tablets containing five to ten mg. of active substance being given four to six times during one day, so that the patient will receive a total daily dose of twenty to sixty mg. of thioxanthene compound.

The synthesis of the new compounds of the present invention is carried out conveniently by first metallising the thioxanthene in the 9 position and then reacting the resultant metallothioxanthene compound with an ester of an alcohol of the class consisting of N-ethyl-piperidyl-3-methanol, N-n-propyl-piperidyl-3-methanol and β-(N-methyl-piperidyl-3)-ethanol, and particularly an ester thereof of a hydrochloric acid, such as hydrochloric or hydrobromic acid, or of an aryl sulfonic acid, particularly benzene sulfonic acid or p-toluene sulfonic acid. The resulting esters of the foregoing alcohols have the following general formulae, respectively:

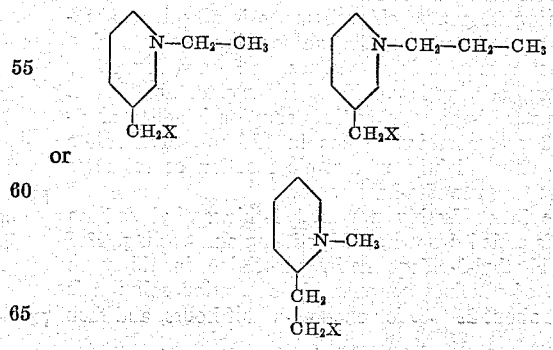

or wherein X represents a halogen molecule, especially chlorine or bromine, or an alkyl sulfonate, particularly benzene sulfonate or p-toluene sulfonate. The reaction is preferably carried out in an inert solvent such as benzene, toluene, dioxane, anisole, etc. The preferred metallising agents are the alkali metal compounds such as aryl sodium, particularly phenyl sodium and tolyl sodium, sodium amide, aryl lithium, alkyl lithium etc. Usually, phenyl sodium, tolyl sodium, and sodium amide will be used because of their relative cheapness and availability. Both reactions can be carried out simultaneously if desired, i.e., the thioxanthene, the metallising agent and the ester can all be reacted together.

A further method of preparation of the new compounds of the present invention consists in hydrogenating a compound of one of the following formulae:

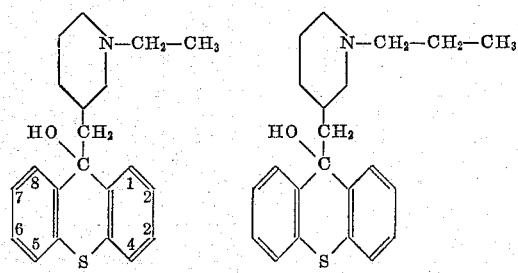

or

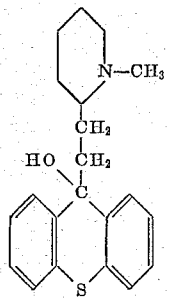

If desired, a dehydration product of the foregoing 9-hydroxy compounds can be used in place of the 9-hydroxy compound. The hydrogenatoin reaction can be carried out with nascent hydrogen, preferably by the use of sodium and an alcohol, or by catalytically hydrogenating. The 9-hydroxy thioxanthene starting material of this method can be produced by reacting a suitably substituted thioxanthene with a 1-ethyl- or 1-n-propyl-piperidino-3-methyl-metallo compound or a 1-methyl-piperidino-2-ethyl-metallo compound respectively, for instance with a Grignard compound, according to known methods.

The following specific examples illustrate methods of preparation of the compounds of the present invention but should not be construed to restrict the invention to the particular reactants or proportions employed.

*Example 1.—9-(N-ethyl-piperidyl-3'-methyl)-thioxanthene*

To a sodium dispersion of 4.9 gm. of finely pulverized sodium in 50 ml. of absolute benzene is added dropwise with stirring 12 gm. of chlorobenzene in 50 ml. of absolute benzene. As soon as the exothermic reaction begins, the temperature is maintained between 30 and 35° C. by cooling, and stirring is continued for two to three hours.

To the resulting phenyl sodium solution is added dropwise 19.8 gm. of thioxanthene in 120 ml. of absolute benzene. The slightly exothermic reaction ceases after about one to one-and-a-half hours.

To the latter freshly prepared 9-thioxanthyl sodium solution is added dropwise with stirring and cooling, 13.5 gm. of N-ethyl-3-chloro-methyl-piperidine in thirty to forty ml. of absolute benzene. The reaction solution is stirred at about 25° C. for one-and-a-half hours, and then heated to 40° C. for one hour. The resulting mixture is decomposed by adding carefully a small amount of water, and the newly formed base is extracted from the benzene solution by means of dilute hydrochloric acid. The aqueous hydrochloric acid solution is made alkaline by adding dilute sodium hydroxide, and the thioxanthene base is isolated by extraction with ether. A yield of 22.1 grams of a slightly yellow, viscous base, 9-(N-ethyl-piperidyl-3'-methyl)-thioxanthene, having a boiling point of 175 to 178° C./0.07 mm. is obtained.

*Example 2.—9-(N-n-propyl-piperidyl-3'-methyl)-thioxanthene*

By following the same procedure as in Example 1, but using instead of the N-ethyl-3-chloromethyl-piperidine, 13.9 gm. of N-n-propyl-3-chloromethyl-piperidine, a yield of 22.0 gm. of the base, 9-(N-n-propyl-piperidyl-3'-methyl)-thioxanthene, is obtained, said base having a boiling point of 178 to 181° C./0.07 mm.

*Example 3.—9-(N-methyl-piperidyl-2'-β-ethyl)-thioxanthene*

By following the same procedure as in Example 1, but using instead of the N-ethyl-3-chloromethyl-piperidine, 13.5 gm. of N-methyl-2-β-chloroethyl-piperidine, a yield of 21.7 gm. of the base, 9-(N-methyl-piperidyl-2'-β-ethyl)-thioxanthene, is obtained, said base having a boiling point of 176 to 179° C./0.07 mm.

*Example 4.—9-(N-ethyl-piperidyl-3'-methyl)-thioxanthene hydrochloride salt*

An ether solvent solution of 9-(N-ethyl-piperidyl-3'-methyl)-thioxanthene is neutralized with an alcoholic solution of hydrogen chloride to form the 9-(N-ethyl-piperidyl-3'-methyl)-thioxanthene hydrogen chloride salt which is crystallised upon addition of ether to give the said salt in the form of colourless prismatic crystals, said salt exhibiting a melting point of 197 to 199° C.

*Example 5.—9-(N-n-propyl-piperidyl-3'-methyl)-thioxanthene hydrochloride salt*

By following the same procedure as in Example 4, but using instead of the 9-(N-ethyl-piperidyl-3'-methyl)-thioxanthene 9 - (N-n-propyl-piperidyl-3'-methyl)-thioxanthene, the corresponding hydrochloride salt is obtained in the form of colourless, prismatic crystals, said salt exhibiting a melting point of 203 to 206° C.

*Example 6.—9-(N-methyl-piperidyl-2'-β-ethyl)-thioxanthene hydrochloride salt*

An ether solvent solution of 9-(N-methyl-piperidyl-2'-β-ethyl)-thioxanthene is neutralized with a suitable organic solvent solution of hydrogen chloride, such as an ether hydrogen chloride solution, to form the 9-(N-methyl-piperidyl-2'-β-ethyl)-thioxanthene hydrachloride salt, which is recrystallised from an acetone-ether solution to give the said salt in the form of colourless, prismatic crystals, said salt exhibiting a melting point of 173 to 176° C.

*Example 7.—9-(N-ethyl-piperidyl-3'-methyl)-thioxanthene*

Thioxanthene is reacted with 1-ethyl-piperidino-3-methyl magnesium chloride according to known methods (cf. A. Marker, Helv. chim. Acta 24 E, 209 [1941] to form 9-(N-ethyl-piperidino-3'-methyl)-thioxanthenol(9). Ten parts of the crude product are dissolved in two hundred parts of propanol. The solution is heated to gentle reflux, and five parts of sodium chips are added in small increments with stirring. After the sodium is completely added, the solvent is removed by distillation. The residue is combined with water and extracted with ether. After evaporation of the solvent, the residue is distilled in vacuo. A viscous alkaline product comprising the base, 9-(N-ethyl-piperidyl-3'-methyl)-thioxanthene, having the boiling point 175 to 178° C./0.07 mm., is obtained in a yield of 85 to 90% of the theoretical. Upon acidification with alcoholic hydrochloric acid and addition of ether (1:2) the hydrochloride addition salt of said base crystallises in colourless prisms, said salt having a melting point 197 to 199° C.

*Example 8.—Preparation of tablets containing 5 mg. of 9-(N-ethyl-piperidyl-3'-methyl)-thioxanthene hydrochloride*

0.500 kg. of 9-(N-ethyl-piperidyl-3'-methyl)-thioxanthene hydrochloride and 14.500 kg. of lactose are mixed. The mixture is kneaded with 0.080 kg. of paraffin oil, 0.010 kg. of sodium alginate (dissolved in 1450 ml. of water) and 350 ml. of water and granulated through Colton screen No. 16. The granulate is dried during 24 hours at 50° C. and then passed through Colton screen No. 16. The moisture content of the granulate should not exceed 0.4% (as measured with the infra-red lamp, position 3, weak, 15 minutes).

15.090 kg. of the granulate are mixed with 1.450 kg. of maize-starch and 1.460 kg. of talcum, and the mixture is compressed into tablets, using a Hänning-machine with 8 mm. flat die having a pressed border and dividing groove (double set). In this way, 100,000 tablets are produced, having the following properties:

| | |
|---|---|
| Tablet weight | 0.18 g. |
| Thickness | 2.4 to 2.6 mm. |
| Disintegration | About 1 minute. |
| Resistance to compression | At least 3 kg. |
| Loss from rotation | Maximum 1.0%. |

I claim:

1. A therapeutic composition in dosage unit form comprising a pharmaceutical carrier and from about 5 to about 100 mg. of a compound selected from the group consisting of 9-(N-methyl-piperidyl-2'-β-ethyl)-thioxanthene, and the pharmaceutically acceptable acid addition salts thereof.

2. A therapeutic composition as in claim 1 wherein the compound is 9-(N-methyl-piperidyl-2'-β-ethyl)-thioxanthene, said composition having marked therapeutic antirigor activity when administered to a living animal.

3. A therapeutic composition as in claim 1 wherein the compound is a pharmaceutically acceptable acid addition salt of 9-(N-methyl-piperidyl-2'-β-ethyl)-thioxanthene, said composition having marked therapeutic antirigor activity when administered to a living animal.

4. A method of treating a living animal to reduce rigor which comprises introducing into the body of a living animal effective amounts of a compound selected from the group consisting of 9-(N-methyl-piperidyl-2'-β-ethyl)-thioxanthene, and the pharmaceutically acceptable acid addition salts thereof.

5. A method as in claim 4 wherein said compound is introduced into said body in an amount of at least about 0.1 mg./kg. of body weight of said animal.

References Cited by the Examiner

UNITED STATES PATENTS

| | | | |
|---|---|---|---|
| 2,368,006 | 1/45 | Cusic | 260—328 |
| 2,676,971 | 4/54 | Cusic | 260—293.4 |
| 2,905,590 | 9/59 | Schmutz | 167—65 |
| 2,964,556 | 12/60 | Pribyl | 167—65 |
| 3,031,459 | 4/62 | Huebner | 167—65 |
| 3,037,980 | 6/62 | Hitchings | 167—65 |
| 3,081,341 | 3/63 | Mooradian | 167—65 |
| 3,102,119 | 8/63 | Knox | 167—65 |

OTHER REFERENCES

Seevers: Dental Abstr., vol. 3, No. 8, August 1958, p. 481.

Kantz: J. Am. Med. Assoc., vol. 166, No. 9, pp. 1040–1041, Mar. 1, 1958.

Bloom: J. A. Chem. Soc., vol. 79, No. 18, p. 5072, 1957.

JULIAN S. LEVITT, *Primary Examiner.*

MORRIS O. WOLK, L. GOTTS, *Examiners.*

UNITED STATES PATENT OFFICE
CERTIFICATE OF CORRECTION

Patent No. 3,179,564   April 20, 1965

Jean Schmutz

It is hereby certified that error appears in the above numbered patent requiring correction and that the said Letters Patent should read as corrected below.

Column 5, line 6, for "1990 C." read -- 199° C. --.

Signed and sealed this 28th day of September 1965.

(SEAL)
Attest:

ERNEST W. SWIDER
Attesting Officer

EDWARD J. BRENNER
Commissioner of Patents